(12) United States Patent
Matsuda et al.

(10) Patent No.: US 10,128,762 B2
(45) Date of Patent: Nov. 13, 2018

(54) SEMICONDUCTOR DEVICE FOR CONTROLLING POWER SOURCE

(71) Applicants: Hiroki Matsuda, Zama (JP); Yukio Murata, Tokyo (JP)

(72) Inventors: Hiroki Matsuda, Zama (JP); Yukio Murata, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/553,361

(22) PCT Filed: Feb. 19, 2016

(86) PCT No.: PCT/JP2016/054792
§ 371 (c)(1),
(2) Date: Aug. 24, 2017

(87) PCT Pub. No.: WO2016/136599
PCT Pub. Date: Sep. 1, 2016

(65) Prior Publication Data
US 2018/0138693 A1    May 17, 2018

(30) Foreign Application Priority Data

Feb. 25, 2015   (JP) ................. 2015-034636

(51) Int. Cl.
*H02M 3/335*   (2006.01)
*H02M 3/28*    (2006.01)

(52) U.S. Cl.
CPC ......... *H02M 3/33507* (2013.01); *H02M 3/28* (2013.01)

(58) Field of Classification Search
CPC ......... H02M 3/33507; H02M 3/33515; H02M 3/33523

(Continued)

(56) References Cited

U.S. PATENT DOCUMENTS 6,674,656 B1 *  1/2004  Yang ................. H02M 3/33523
                                                          363/21.1
2012/0147630 A1  6/2012  Cao et al.
(Continued)

FOREIGN PATENT DOCUMENTS

JP       05344712 A    12/1993
JP     2002142456 A     5/2002
(Continued)

OTHER PUBLICATIONS

International Search Report (ISR) and Written Opinion dated May 10, 2016 issued in International Application No. PCT/JP2016/054792.

(Continued)

*Primary Examiner* — Nguyen Tran
(74) *Attorney, Agent, or Firm* — Holtz, Holtz & Volek PC

(57) ABSTRACT

A semiconductor device for power supply control includes an over-current detection circuit which detects an over-current state on a secondary side of a transformer by comparing a voltage in proportion to current flowing in a primary-side winding wire with an over-current detection voltage; a control signal generation circuit which generates a control signal to turn off a switching element when the over-current detection circuit has detected the over-current state; and an over-current detection level generation circuit which generates the over-current detection voltage in accordance with an on-duty of a driving pulse of the switching element. The over-current detection level generation circuit is configured to generate the over-current detection voltage in accordance with: Vocp=Vint+a·ON Duty, where Vocp represents the over-current detection voltage, ON Duty represents the on-duty, Vint represents the over-current detection voltage to be a reference, and "a" represents a correction coefficient.

2 Claims, 9 Drawing Sheets

(58) Field of Classification Search
USPC .......................................... 363/21.12–21.18
See application file for complete search history.

(56) References Cited

U.S. PATENT DOCUMENTS

2013/0135775 A1  5/2013  Yao et al.
2014/0362610 A1* 12/2014  Stracquadaini ... H02M 3/33507
                                              363/21.13

FOREIGN PATENT DOCUMENTS

| JP | 2005341730 A | 12/2005 |
| JP | 2012235561 A | 11/2012 |
| JP | 2014096891 A | 5/2014 |

OTHER PUBLICATIONS

International Preliminary Report on Patentability (IPRP) dated Aug. 29, 2017 issued in counterpart International Application No. PCT/JP2016/054792.
Extended European Search Report dated Sep. 13, 2018 issued in counterpart European Application No. 16755345.2.
Japanese Office Action dated Oct. 2, 2018 (and English translation thereof) issued in counterpart Japanese Application No. 2015-034636.

* cited by examiner

Duty: LESS THAN 48%

Duty: 48% OR MORE

SEMICONDUCTOR DEVICE FOR CONTROLLING POWER SOURCE

TECHNICAL FIELD

The present invention relates to a semiconductor device for power supply control, and particularly to a technique effectively used when an operating point of an over-current protection circuit in an insulated direct-current power supply device including a transformer for voltage conversion is corrected by a semiconductor device for power supply control.

BACKGROUND ART

Examples of direct-current power supply devices include an insulated AC-DC converter which is structured by, for example, a diode bridge circuit that rectifies an alternating-current power supply and a DC-DC converter that steps down the direct-current voltage rectified in the diode bridge circuit to convert the voltage into a direct-current voltage with a desired potential. One known example of such an insulated AC-DC converter is a switching power supply device in which a switching element connected in series with a primary-side winding wire of a transformer for voltage conversion is turned on or off by a PWM (pulse width modulation) control method, a PFM (pulse frequency modulation) control method, or the like to control the current flowing in the primary-side winding wire, so that the voltage induced by a secondary-side winding wire is controlled indirectly.

Incidentally, in the insulated direct-current power supply device, a rated load current (or maximum load current) is defined and if the over-current state in which current flowing on the secondary side increases to be the rated load current or more occurs, the power supply device maybe damaged. In view of this, a control circuit on a primary side is often provided with an over-current detection function and an over-current protection function that turns off the switching element upon detecting the over-current.

Examples of methods for detecting the over-current state of the output in the switching control type insulated direct-current power supply device include a method of monitoring voltage obtained by current-voltage conversion (peak value of voltage with a triangular waveform) by a resistor for current detection that is provided in series with the switching element on the primary side (for example, see Patent Literature 1).

CITATION LIST

Patent Literatures

Patent Literature 1: JP 2005-341730 A
Patent Literature 2: JP 2012-235561 A

SUMMARY OF INVENTION

Problem to be Solved by Invention

Incidentally, an AC-DC converter whose input specification is common worldwide needs to be operable relative to the input alternating-current voltage in the relatively wide range of, for example, 85 V to 276 V. However, in the power supply device as disclosed in Patent Literature 1 employing the method of monitoring the voltage subjected to the current-voltage conversion, the peak current Ip on the primary side changes as shown in FIG. 11 depending on the magnitude of the AC input voltage VAC.

Therefore, if any measures are not taken, that is, assuming that, for example, the over-current protection function is designed to work at the operating point as shown by a dashed line in FIG. 12 to decrease the output voltage Vout when the AC input voltage is 100 V, the operating point (current value Idet) at which the over-current protection function works deviates as shown by a solid line or a dash-dot line when the voltage is 85 V or 276 V.

FIG. 8 shows how the operating point of the over-current protection circuit changes relative to the magnitude of the AC input voltage VAC. If any measures are not taken, the operating point Idet of the over-current protection circuit changes as shown by a solid line A in FIG. 8 in accordance with VAC and the appropriate over-current protection cannot be performed. Note that the ideal characteristic is in that the VAC-Idet characteristic is flat.

In view of the above, the present inventors have made the invention related to the direct-current power supply device that can perform the appropriate over-current protection for the input voltage in the wide range by correcting the operating point of the over-current protection circuit in advance, and filed a patent application (Patent Literature 2).

According to the invention of Patent Literature 2, the power supply control circuit that performs control to turn on or off the switching element is provided with the over-current detection circuit for detecting the over-current state on the secondary side by comparing a voltage in proportion to the current flowing in the primary-side winding wire of the transformer with a comparison reference voltage. The comparison reference voltage is corrected in accordance with the on-duty of the driving pulses of the switching element, so that the comparison reference voltage changes in accordance with the characteristic curve which represents the relation between the alternating-current input voltage and the on-duty.

As an example of the means for correcting the comparison reference voltage in accordance with the on-duty, a duty detection circuit that detects the on-duty of the driving pulses and a variable voltage source that generates the comparison reference voltage in accordance with the voltage from the duty detection circuit are provided. The duty detection circuit includes a counter that counts the on time Ton and the period T0 of the driving pulses, and a circuit that outputs the voltage corresponding to the on-duty (Ton/T0) from the counted period T0 and on time Ton. The correction is achieved by such a structure.

However, correcting the comparison reference voltage as above additionally requires an oscillation circuit (frequency division circuit when the oscillation circuit is shared) to generate clocks with sufficiently higher frequency than the frequency of the driving pulses in order to operate the counter. This results in a problem that the circuit scale increases, the chip size increases, and moreover the power consumption increases.

The present invention has been made in view of the above and an object is to provide a technique that can perform the appropriate over-current protection relative to the input voltage in a wide range by correcting the operating point of an over-current protection circuit without drastically enlarging the circuit scale or increasing the power consumption in a controlling semiconductor device of an insulated direct-current power supply device that includes a transformer for voltage conversion and controls the output by turning on or off the current flowing in a primary-side winding wire.

Solution to Problem

In order to achieve the above object, there is provided a semiconductor device for power supply control, that generates and outputs a driving pulse for performing control to turn on or off a switching element which supplies intermittently current to a primary-side winding wire of a transformer for voltage conversion, in accordance with voltage in proportion to current flowing in the primary-side winding wire of the transformer and an output voltage detection signal from a secondary side of the transformer, the device including:

an over-current detection circuit which detects an over-current state on a secondary side of the transformer by comparing the voltage in proportion to current flowing in the primary-side winding wire with an over-current detection voltage;

a control signal generation circuit which generates a control signal to turn off the switching element when the over-current detection circuit has detected the over-current state; and an over-current detection level generation circuit which generates the over-current detection voltage in accordance with an on-duty of the driving pulse of the switching element, wherein the over-current detection level generation circuit is configured to generate the over-current detection voltage in accordance with the formula:

$$Vocp = Vint + a \cdot ON\ Duty$$

where Vocp represents the over-current detection voltage, ON Duty represents the on-duty, Vint represents the over-current detection voltage to be a reference, and "a" represents a correction coefficient.

According to the above structure, even though the alternating-current input voltage varies, the operating point of the over-current protection hardly changes. Therefore, the characteristic which represents the relation between the alternating-current input voltage and the over-current protection operating point becomes flat and thus, the over-current protection can be performed at the point appropriate for the alternating-current input voltage in a wide range. Moreover, since the oscillation circuit for detecting the on-duty is unnecessary, the over-current protection can be performed at the point appropriate for the alternating-current input voltage in a wide range without drastically enlarging the circuit scale or increasing the power consumption. Furthermore, the over-current detection level generation circuit generates the over-current detection voltage in accordance with the on-duty of the driving pulses; therefore, even though the switching frequency changes, the on-duty can be detected in real time and accordingly, the on-duty can always be reflected in the over-current detection voltage in real time.

It is preferred that the semiconductor device for power supply control includes a non-inversion amplification circuit which amplifies the voltage in proportion to the current flowing in the primary-side winding wire and supplies the amplified voltage to the over-current detection circuit, wherein an amplification ratio A of the non-inversion amplification circuit is set so that a product of the amplification ratio A and the correction coefficient "a", A·a, is substantially 1.

This eliminates the necessity of providing the multiplying circuit, which is difficult to design, in the over-current detection level generation circuit. Therefore, the design burden can be reduced.

In addition, it is preferred that the over-current detection level generation circuit includes:

a variable current source which generates current in accordance with an output voltage detection signal from the secondary side;

a capacitor element which is charged with current from the variable current source;

a discharging means which discharges the charges in the capacitor element by a change from an on-level to an off-level of the driving pulse; and an intercept voltage generation circuit which generates a reference voltage of the over-current detection voltage, wherein in a period for which the driving pulse is at the on-level, a voltage charged in the capacitor element with the current from the variable current source connected to the capacitor element is added to the voltage output from the intercept voltage generation circuit.

Thus, by merely combining the known element circuits, the circuit that generates the over-current detection level for enabling the over-current protection at the point appropriate for the alternating-current input voltage in a wide range can be achieved easily.

Further, it is preferred that the semiconductor device for power supply control includes a clock generation circuit which includes an oscillation circuit whose frequency is variable in accordance with the magnitude of current flowing from the variable current source that generates current in accordance with an output voltage detection signal from the secondary side and which generates a clock signal that provides a timing to turn on the switching element periodically, wherein the variable current source in the over-current detection level generation circuit is configured as a variable current source common to the variable current source in the clock generation circuit.

This can suppress the enlargement in circuit occupied area or the drastic increase in power consumption.

Advantageous Effects of Invention

The present invention provides an effect that the appropriate over-current protection can be performed relative to the input voltage in a wide range by correcting the operating point of an over-current protection circuit without drastically enlarging the circuit scale or increasing the power consumption in a controlling semiconductor device of an insulated direct-current power supply device that includes a transformer for voltage conversion and controls the output by turning on or off the current flowing in a primary-side winding wire.

EMBODIMENTS FOR CARRYING OUT INVENTION

A preferred embodiment of the present invention will hereinafter be described with reference to the drawings.

Figure 1:
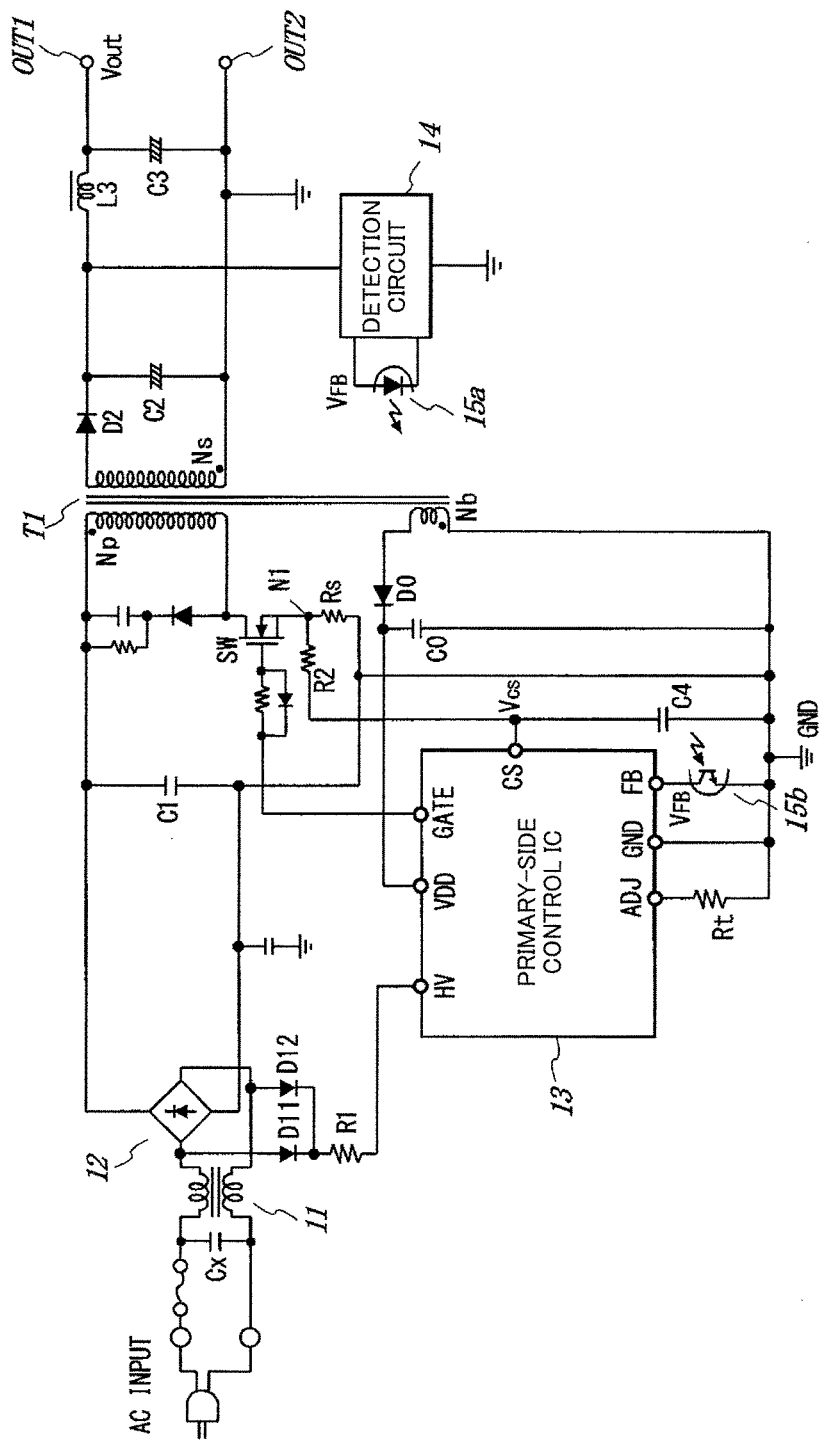
FIG. 1 is a circuit structure diagram illustrating one embodiment of an AC-DC converter corresponding to an insulated direct-current power supply device according to the present invention.

FIG. 1 is a circuit structure diagram illustrating one embodiment of an AC-DC converter corresponding to an insulated direct-current power supply device to which the present invention has been applied.

The AC-DC converter according to this embodiment includes: an X condenser Cx connected between AC input terminals for attenuating the normal-mode noise; a line filter 11 for blocking noise including a common-mode coil and the like; a diode bridge circuit 12 that rectifies alternating-current voltage (AC); a smoothing condenser C1 that smooths the rectified voltage; a transformer T1 for voltage conversion including a primary-side winding wire Np, a secondary-side winding wire Ns, and an auxiliary winding wire Nb; a switching transistor SW including an N-channel MOSFET connected in series with the primary-side winding wire Np of this transformer T1; and a power supply control circuit 13 that drives the switching transistor SW. In this embodiment, the power supply control circuit 13 is formed as a semiconductor integrated circuit (hereinafter referred to as a power supply control IC) on one semiconductor chip formed of single-crystal silicon or the like.

On the secondary side of the transformer T1, a rectifying diode D2 connected in series with the secondary-side winding wire Ns and a smoothing condenser C2 connected between a cathode terminal of this diode D2 and the other terminal of the secondary-side winding wire Ns are provided. By supplying current intermittently to the primary-side winding wire Np, the alternating-current voltage is induced by the secondary-side winding wire Ns, and by rectifying and smoothing this induced alternating-current voltage, the direct-current voltage Vout in accordance with the winding wire ratio between the primary-side winding wire Np and the secondary-side winding wire Ns is output.

In addition, a coil L3 and a condenser C3 are provided on the secondary side of the transformer T1. The coil L3 and the condenser C3 form a filter for blocking the switching ripple noise and the like occurring in the switching operation on the primary side. Moreover, on the secondary side of the transformer T1, a detection circuit 14 for detecting the output voltage Vout and a photodiode 15a as an emission-side element of a photocoupler are provided. The photodiode 15a is connected to the detection circuit 14 and transmits a signal in accordance with the detected voltage to the power supply control IC 13. Then, on the primary side, a phototransistor 15b is provided as a light-reception-side element. The phototransistor 15b is connected between a ground point and a feedback terminal FB of the power supply control IC 13 and receives a signal from the detection circuit 14.

On the primary side of the AC-DC converter according to this embodiment, a rectifying/smoothing circuit is provided. The rectifying/smoothing circuit includes a rectifying diode D0 connected in series with the auxiliary winding wire Nb, and a smoothing condenser C0 connected between a cathode terminal of this diode D0 and the ground point GND. The voltage rectified and smoothed by the rectifying/smoothing circuit is applied to the power supply voltage terminal VDD of the power supply control IC 13.

On the other hand, the power supply control IC 13 includes the high-voltage input start terminal HV to which the voltage before being rectified in the diode bridge circuit 12 is applied through diodes D11 and D12 and a resistor R1, and is configured to operate based on the voltage from this high-voltage input start terminal HV when the AC input is supplied (just after a plug is inserted).

In addition, in the present embodiment, a resistor Rs for current detection is connected between the ground point GND and a source terminal of the switching transistor SW, and moreover a resistor R2 is connected between a current detection terminal CS of the power supply control IC 13 and a node N1 between the switching transistor SW and the current detection resistor Rs. Furthermore, a condenser C4 is connected between the ground point and the current detection terminal CS of the power supply control IC 13. The resistor R2 and the condenser C4 form a low-pass filter.

Next, a specific structure example of the power supply control IC 13 is described.

The power supply control IC 13 according to the present embodiment includes an external set terminal ADJ for setting the switching period from the outside, and is configured to select one of two feedback voltage-frequency characteristics prepared in advance in accordance with the setting state of the external set terminal ADJ and perform the output voltage control in accordance with the selected characteristic. Specifically, one of two characteristics A and B shown in FIG. 7 can be selected. Note that in the drawings and the following description, "the feedback voltage" may be abbreviated as "FB voltage".

In regard to the FB voltage-frequency characteristics A and B, when the feedback voltage VFB is VFB1 (for example, 1.8 V) or less, the PWM control is performed at the same and constant frequency of, for example, 22 kHz in both the characteristics A and B; when the feedback voltage VFB is VFB2 (for example, 2.1V) or more, the PWM control is performed at a constant frequency of, for example, 100 kHz in the characteristic A and at a constant frequency of, for example, 66 kHz in the characteristic B. Moreover, when the feedback voltage VFB is between VFB1 and VFB2 the control is performed so that the frequency changes linearly in accordance with the change in feedback voltage VFB. Note that the aforementioned VFB1 (1.8 V) and VFB2 (2.1 V) where the control is switched, the fixed frequency (22 kHz) in a region less than or equal to VFB1, and the fixed frequency (66 kHz, 100 kHz) in a region of VFB2 or more are just examples and the numerical values are not limited to those above.

Figure 2:
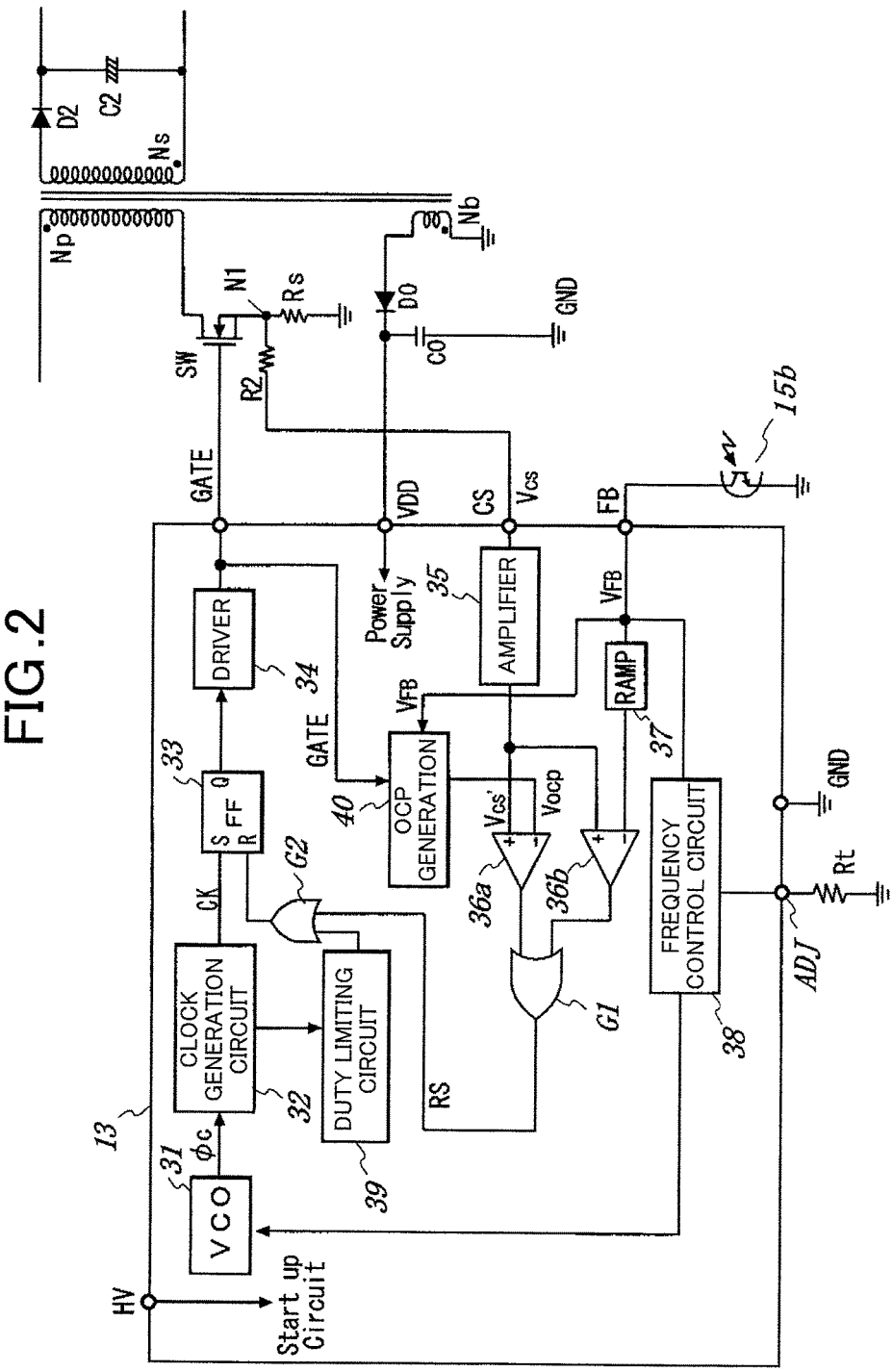
FIG. 2 is a block diagram illustrating a structure example of a primary-side switching power supply control circuit (power supply control IC) of a transformer in the AC-DC converter in FIG. 1.

FIG. 2 illustrates a structure example of the power supply control IC 13 according to the present embodiment having the function as above.

As illustrated in FIG. 2, the power supply control IC 13 according to this example includes: an oscillation circuit 31 that oscillates at the frequency in accordance with the voltage VFB of the feedback terminal FE; a clock generation circuit 32 including a circuit like a one-shot pulse generation circuit that generates a clock signal CK for providing the timing to turn on the primary-side switching transistor SW on the basis of an oscillation signal φc generated in the oscillation circuit 31; an RS/flip-flop 33 that is set by the clock signal CK; and a driver (driving circuit) 34 that generates a driving pulse GATE of the switching transistor SW in accordance with the output of the flip-flop 33. In this specification, the combination of the oscillation circuit 31 and the clock generation circuit 32 is referred to as the clock generation circuit.

Figure 3A:
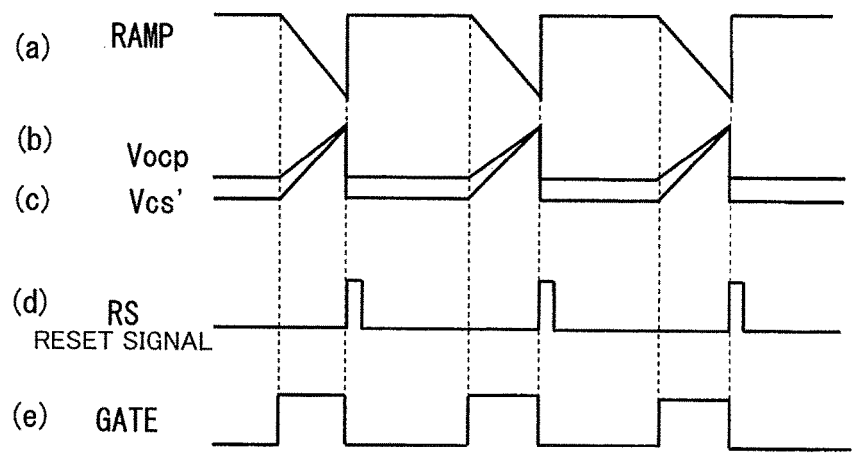
FIG. 3A is a waveform diagram illustrating the change of voltage in each unit when the duty of the driving pulses is less than 48% in the power supply control IC according to the example.
Figure 3B:
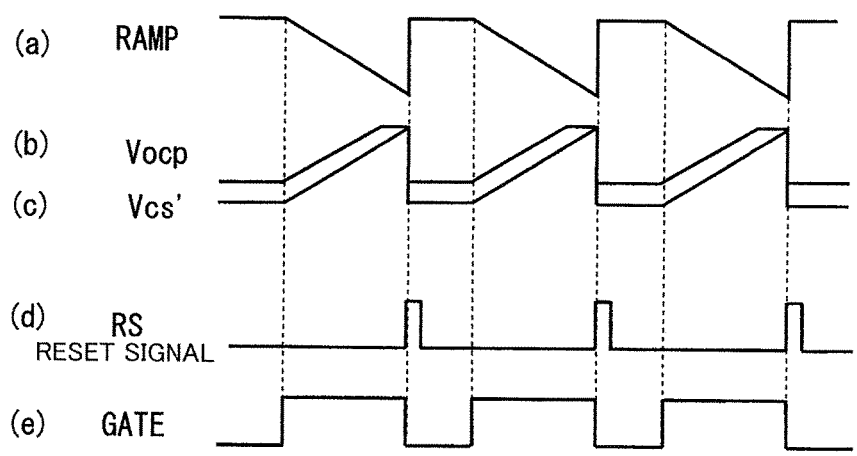
FIG. 3B is a waveform diagram illustrating the change of voltage in each unit when the duty of the driving pulses is 48% or more in the power supply control IC according to the example.

Moreover, the power supply control IC 13 includes: an amplifier 35 that amplifies the voltage Vcs input to the current detection terminal CS; a comparator 36a as a voltage comparison circuit that compares the voltage Vcs' amplified by the amplifier 35 with a comparison voltage (threshold voltage) Vocp for monitoring the over-current state; a waveform generation circuit 37 that generates a voltage RAMP with a predetermined waveform as illustrated in (a) of FIG. 3A and FIG. 3B on the basis of the voltage VFB of the feedback terminal FB; a comparator 36b that compares a potential Vcs' having a waveform as illustrated in (c) that is amplified by the amplifier 35 with a waveform RAMP generated by the waveform generation circuit 37; and an OR gate G1 that implements the OR operation of the outputs of the comparators 36a and 36b. In the power supply control IC 13 according to the present example, the voltage RAMP in (a) of FIG. 3A and FIG. 3B is generated so as to decrease from the FB voltage with a constant inclination.

In this structure, when the output RS of the OR gate G1 (see FIG. 3(d)) is input to the reset terminal of the flip-flop 33 through the OR gate G2, the timing to turn off the switching transistor SW is provided. Note that a pull-up resistor or a constant-current source is provided between the feedback terminal FB and an internal power supply voltage terminal, and the current flowing in the phototransistor 15b is converted into voltage by the resistor. The waveform generation circuit 37 is provided in order to deal with the sub-harmonic oscillation, and another structure may alternatively be employed in which the voltage VFB is input to the comparator 36b directly or after being level-shifted.

Figure 7:
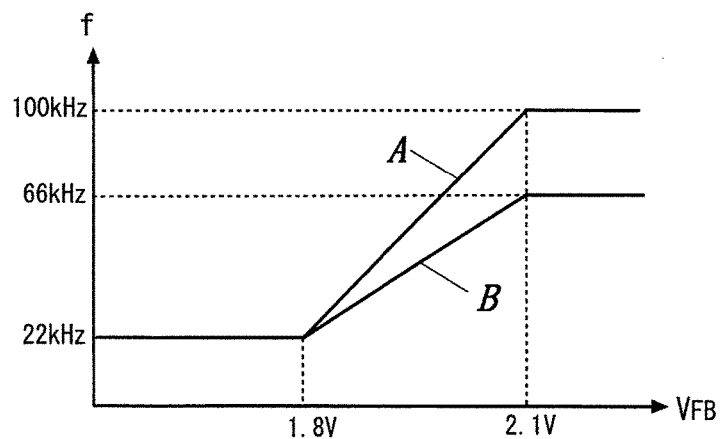
FIG. 7 is a characteristic diagram expressing the relation between the feedback voltage VFB and the switching frequency in the power supply control IC according to the example.

Furthermore, the power supply control IC 13 according to the present example includes a frequency control circuit 38 that changes the oscillation frequency of the oscillation circuit 31, that is, the switching frequency on the basis of the voltage VFB of the feedback terminal FB in accordance with the characteristic as expressed in FIG. 7. The frequency control circuit 38 may be formed of a buffer such as a voltage follower and a clamp circuit When the voltage of the feedback terminal FB is, for example, 1.8 V or less, the clamp circuit clamps the voltage to 1.8 V, and when the voltage is 2.1 V or more, the clamp circuit clamps the voltage thereof to 2.1 V. Although not shown, the oscillation circuit 31 includes an oscillator which is provided with a current source that supplies current in accordance with the voltage from the frequency control circuit 38 and whose oscillation frequency changes depending on the magnitude of current supplied from the current source.

Additionally, the power supply control IC 13 according to the present example includes the frequency control circuit 38 that monitors the voltage VFB of the feedback terminal FB and the voltage of the external set terminal ADJ, and changes the oscillation frequency of the oscillation circuit 31, that is, the switching frequency on the basis of the voltages of these terminals in accordance with the characteristics expressed in FIG. 7. Although not shown, a pull-up resistor or a constant-current source is provided between the external set terminal ADJ and the internal power supply voltage terminal, and the current flowing in an external resistor Rt connected to the external set terminal ADJ is converted into voltage through the resistor and the frequency control circuit 38 is configured to switch the characteristic of the oscillation frequency controlled based on the voltage of the external set terminal ADJ to A or B. This enables a user to change the FB voltage-frequency characteristic by selecting the resistance value of the external resistor Rt to connect to the external set terminal ADJ.

Furthermore, the power supply control IC 13 according to the present example includes a duty limiting circuit 39 that generates a maximum duty reset signal for limiting the duty (Ton/Tcycle) of the driving pulse GATE so that the duty does not exceed a prescribed maximum value (for example, 85% to 90%) on the basis of the clock signal CK output from the clock generation circuit 32. The maximum duty reset signal output from the duty limiting circuit 39 is supplied to the flip-flop 33 through the OR gate G2 and when the pulse has reached the maximum duty, the flip-flop 33 is reset at that time; thus, the switching transistor SW is turned off immediately.

Further, the power supply control IC 13 according to the present example includes an over-current detection level generation circuit 40 that generates an over-current detection voltage Vocp to be applied as a comparison voltage to the over-current detection comparator 36a that monitors the voltage Vcs of the current detection terminal CS and detects the over-current. To this over-current detection level generation circuit 40, the driving pulse GATE output from the driver 34 and the voltage VFB of the feedback terminal FB are input, and based on these signals, the over-current detection level generation circuit 40 detects the on-duty and generates the over-current detection level Vocp that changes in accordance with the characteristic as expressed in FIG. 4 on the basis of the detected on-duty.

Figure 5:
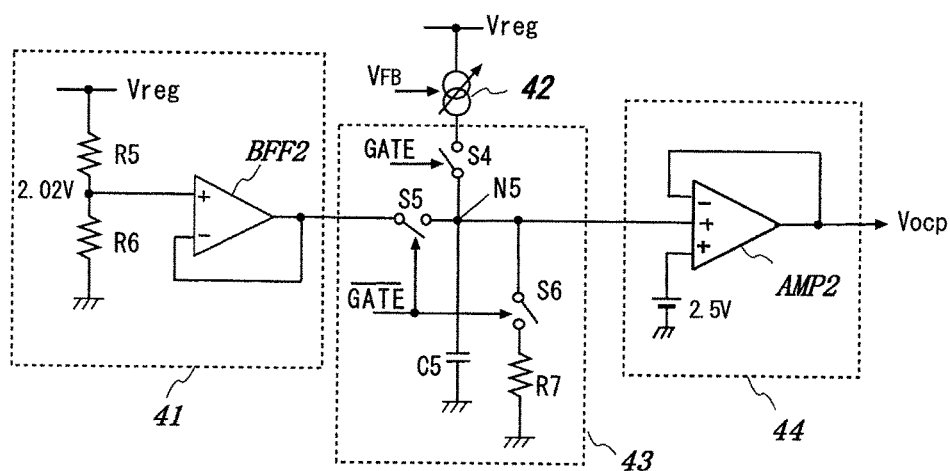
FIG. 5 is a circuit structure diagram illustrating a specific circuit structure example of an OCP level generation circuit.

FIG. 5 illustrates a specific circuit structure example of the over-current detection level generation circuit 40 in the power supply control IC in FIG. 2.

As illustrated in FIG. 5, the over-current detection level generation circuit 40 includes, for example: a buffer (voltage follower) BFF2 that receives a voltage Vint (2.02 V) obtained by dividing a voltage Vreg from an internal power supply circuit in serially connected resistors R5 and R6; a variable current circuit 42 that supplies current in accordance with the voltage VFB of the feedback terminal FB; an OPS waveform generation circuit 43 that generates the OPS level by using the current from the variable current circuit 42; and a buffer amplifier 44 that performs the impedance conversion of the generated OPS voltage, outputs the voltage, and clamps the voltage.

The OPS waveform generation circuit 43 includes: a switch S4 and a condenser C5, which are connected in series between the variable current circuit 42 and the ground point; a switch S5 which is provided between the buffer BFF2 and a connection node N5 between the switch S4 and the condenser C5; and a switch S6 and a resistor R7 which are connected in series between the connection node N5 and the ground point. The switch S4 is turned on or off by the driving pulse GATE output from the driver 34, and the switches S5 and S6 are turned on or off by /GATE corresponding to a signal obtained by inverting the driving pulse GATE.

Figure 4:
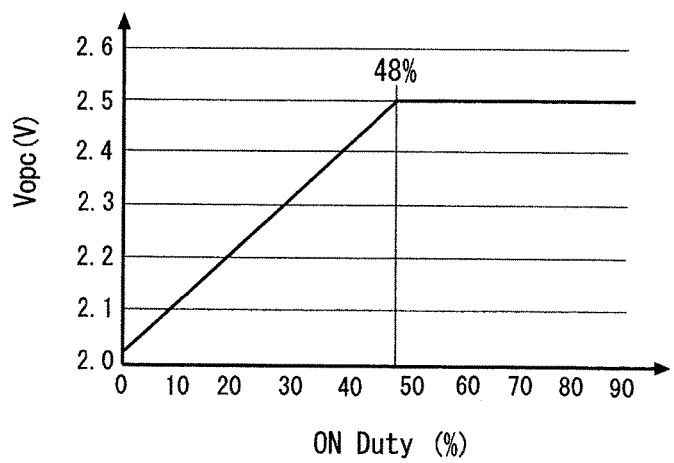
FIG. 4 is a graph expressing the characteristic which represents the relation between the on-duty and the over-current detection level in the power supply control IC according to the example.

The over-current detection level generation circuit 40 illustrated in FIG. 5 is a circuit that provides the over-current detection level Vocp with the characteristic expressed in FIG. 4, and the voltage Vint to be input to the buffer BFF2 corresponds to an intercept voltage where the right upward line in FIG. 4 intersects with the Y axis (Vocp), that is, a reference level of the over-current detection (2.02 V). Therefore, the resistors R5 and R6 for dividing the voltage and the buffer BFF2 function as a circuit that generates the intercept voltage Vint (intercept voltage generation circuit 41). Note that since the intercept voltage Vint corresponds to 0.42 V if converted into the voltage Vcs of the current detection terminal CS, the amplifier 35 illustrated in FIG. 2 has a function of amplifying the input voltage Vcs by 4.8 times in the present example.

As illustrated in FIG. 4, the buffer amplifier 44 functions as a clamp circuit that restricts the upper limit of the over-current detection level Vocp to a predetermined level (2.5 V) in a region where the on-duty is 48% or more.

In regard to the characteristic illustrated in FIG. 4, the inclination of the linear part where the on-duty is less than 48% is 1, and this is expressed in the formula below. Note that in the formula below, "ON Duty" is not the value in percentage (%) but the value expressed in decimal point (when it is 25%, the value is expressed as 0.25, and when it is 30%, the value is expressed as 0.30).

$Vocp = Vint + \text{ON Duty}$ (ON Duty<48%)

$Vocp = \text{constant}$ (2.5 V) (ON Duty≥48%)

In the power supply circuit examined by the present inventors, the over-current detection level OCP relative to the voltage Vcs of the current detection terminal CS is expressed by the formula:

$OCP = Vint + a \cdot \text{ON Duty} = 0.42 \text{ V} + a \cdot \text{ON Duty}$

In the formula, Vint is 0.42 V and "a", which is the correction coefficient, is "0.21". The amplification ratio of the amplifier 35 is easily set but, on the contrary, it is relatively complicated to design a multiplication circuit that generates a voltage obtained by multiplying ON Duty by the correction coefficient "a" expressed in a decimal point such as "0.21" and it takes effort to carry out this design. Therefore, in a manner similar to the interception, by multiplying "a" (=0.21) by 4.8, the numeral is regarded as "≈1" and the circuit that generates the over-current detection level Vocp approximately expressed by Vocp=2.02 V+ON Duty is realized.

In the over-current detection level generation circuit 40 illustrated in FIG. 5, the OPS waveform generation circuit 43 is configured so that: the condenser C5 is charged with constant current from the variable current circuit 42; and the charges in the condenser C5 are discharged through the resistor R7. The switch S4 that controls the charging is turned on by the driving pulse GATE, and the switch S6 that controls the discharging is turned on by the /GATE corresponding to the inverted signal of the driving pulse GATE. Thus, the over-current detection level generation circuit 40 generates the over-current detection level Vocp corresponding to the on time.

That is to say, the variable current circuit 42, the switch S4, and the condenser C5 function as the charging controlling means that generates the voltage in proportion to the on time Ton, and the condenser C5, the switch S6, and the resistor R7 function as the discharging controlling means that controls the discharging in the off time.

In addition, in the present example, the variable current circuit 42 supplies current in accordance with the voltage VFB of the feedback terminal FB; on the other hand, as described in detail below, the oscillation circuit 31 (see FIG. 6) includes a current source circuit 311 that supplies the current in accordance with the feedback voltage VFB, which is similar to the variable current circuit 42, and with this current, the condenser is charged and thus, an oscillation signal (triangular wave) is generated in the oscillator unit 313. Therefore, the switching frequency that is controlled based on the oscillation signal φc is the frequency in accordance with the feedback voltage VFB. That is to say, the OPS waveform generation circuit 43 including the variable current circuit 42 that supplies current in accordance with the feedback voltage VFB charges the condenser C5 with the current reflecting the information of the switching frequency, that is, the switching period. The charging period of this condenser C5 corresponds to the on time of the switching transistor SW. As a result, the generated over-current detection level Vocp reflects the on-duty.

The over-current detection level generation circuit 40 according to the present example includes in an output unit, the buffer amplifier 44 functioning as a clamp circuit. Thus, when the on-duty is less than 48%, the OCP level Vocp with the waveform as expressed in (b) of FIG. 3A (triangular wave) is generated and supplied to the over-current detection comparator 36a; when the on-duty is 48% or more, the OCP level Vocp with the waveform as expressed in (b) of FIG. 3B (trapezoidal wave) is generated and supplied to the over-current detection comparator 36a, and in this manner, the over-current detection is carried out. As a result, the peak value of the current flowing in the primary winding wire can be prevented from becoming too high.

Note that the power supply device is designed so that in the normal load state, the power supply device operates in the most part of the period with an on-duty of 50% or less. Therefore, the situation in which the flatness of the VAC-Idet characteristic is lost because of the control to restrict the peak value as above hardly occurs, and such a control does not lead to a problem.

Figure 8:
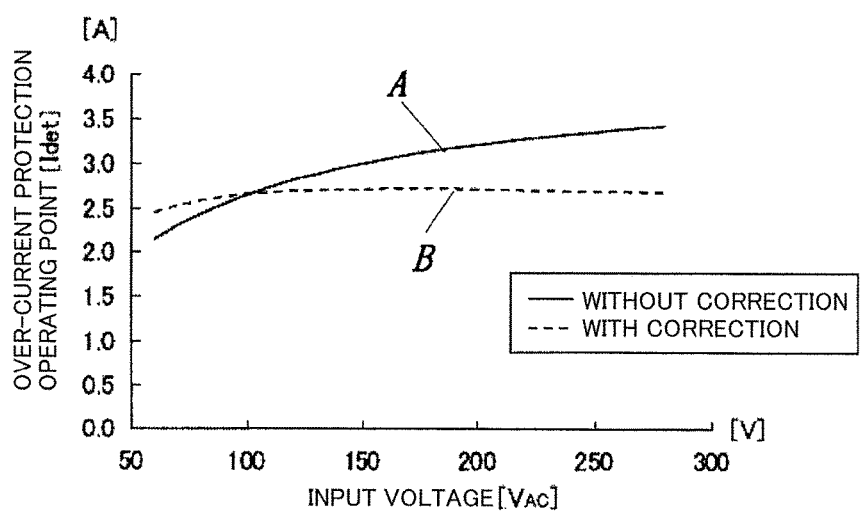
FIG. 8 is a graph expressing the input voltage characteristic of the over-current protection operating point Idet in the AC-DC converter whose over-current protection operating point is not corrected and in the AC-DC converter whose over-current protection operating point is corrected.

In FIG. 8, the dashed line B expresses the VAC-Idet characteristic in the case where the over-current detection level generation circuit 40 according to the above example is applied. Note that the solid line A expresses the VAC-Idet characteristic in the case where the over-current detection level generation circuit 40 that can correct the over-current detection level is not provided. FIG. 8 indicates that providing the over-current detection level generation circuit 40 that can correct the over-current detection level can drastically improve the flatness of the VAC-Idet characteristic as compared to the case in which such a circuit is not provided.

Note that since the over-current protection operating point corresponds to the over-current protection operation load current, the characteristic which represents the relation between the input voltage and the over-current protection operation load current is also the characteristic similar to the VAC-Idet characteristic in FIG. 8. In other words, it can be said that FIG. 8 shows the characteristic which represents the relation between the input voltage and the over-current protection operation load current.

The above description indicates that in the power supply control IC including the over-current detection level generation circuit 40 according to the present example, the on-duty, which is not in the previous cycle but in the cycle at that time, can be reflected in the OCP level in real time. As a result, the highly accurate correction of the over-current detection level becomes possible.

Note that FIG. 3A and FIG. 3B express the operation waveform when the load current increases so that the feedback voltage VFB, that is, the RAMP wave becomes higher than the OCP level. When the magnitude of load current is normal, the feedback voltage VFB, that is, the RAMP wave becomes lower than the OCP level Vocp and the reset signal RS is generated when the Vcs' corresponding to the value obtained by multiplying the voltage Vcs of the current detection terminal CS by the gain has reached the RAMP wave determined by the feedback voltage VFB, and then the switching element is turned off.

In the above example (FIG. 5), the driving pulse GATE is used to detect the on-duty but the output signal of the flip-flop 33 in the previous stage may be used instead of the driving pulse GATE. The variable current circuit 42 can share a current circuit including an upper and lower limit clamp circuit 81, a reference voltage circuit 82, a non-inversion amplification circuit 83, a buffer circuit 84, and the current source circuit 311 in the frequency control circuit 38 (FIG. 6) to be described below.

Figure 6:
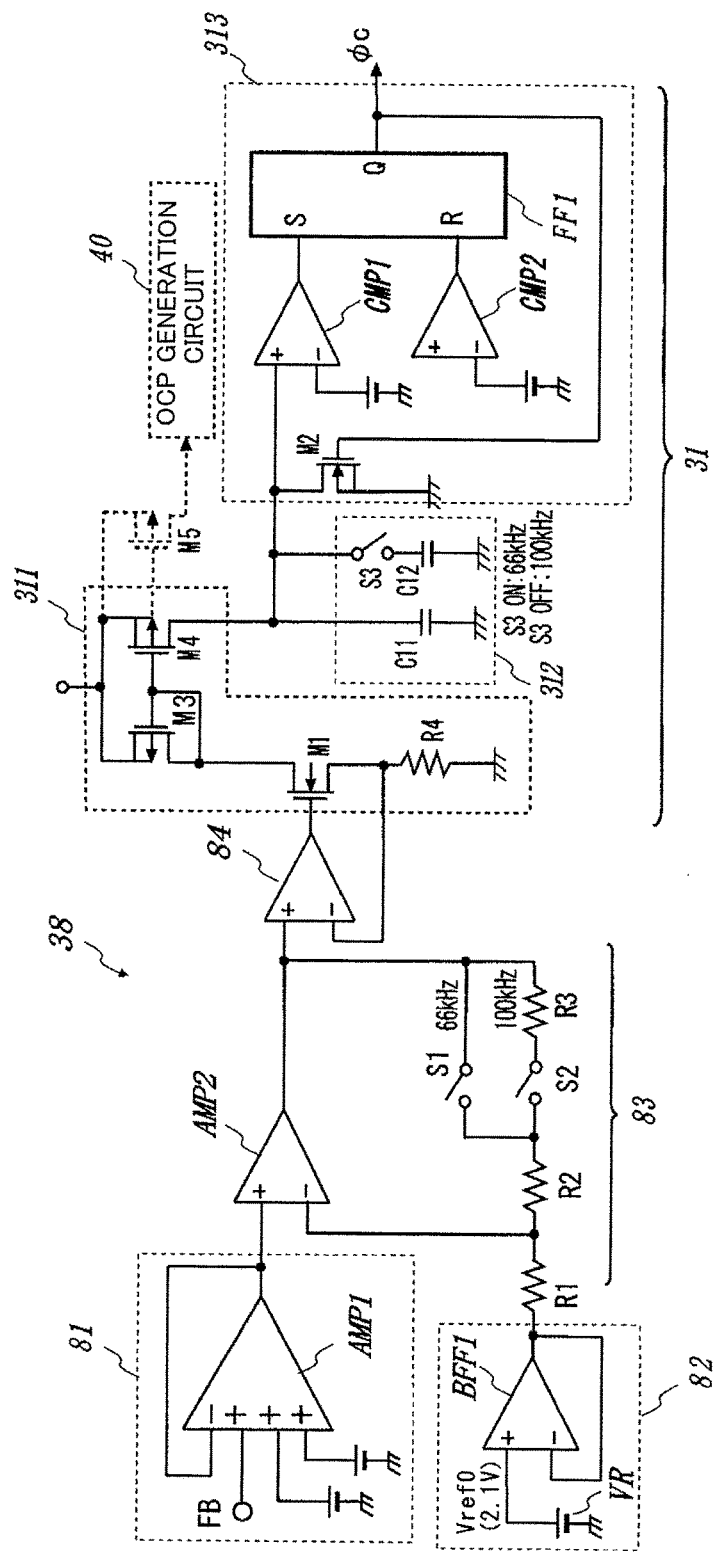
FIG. 6 is a circuit structure diagram illustrating a specific circuit structure example of a frequency control circuit.

Specifically, for example, as indicated by a dashed line in FIG. 6, in parallel to a current mirror M4 included in the current source circuit 311 of the frequency control circuit 38, a MOS transistor M5 is provided. To a gate terminal of the MOS transistor M5, the same gate voltage as that of M4 is applied. The drain current of this transistor M5 is supplied to the over-current detection level generation circuit 40. This can reduce the number of elements constituting the circuit.

FIG. 6 illustrates a structure example of the frequency control circuit 38 of the power supply control IC 13 according to the present embodiment.

As illustrated in FIG. 6, the frequency control circuit 38 includes: the upper and lower limit clamp circuit 81 that, when the voltage VFB of the feedback terminal FB is a predetermined voltage VFB1 (1.8 V) or less, clamps the voltage to VFB1 and when the voltage VFB is VFB2 (2.1 V) or more, clamps the voltage to VFB2 (2.1 V); the reference voltage circuit 82 that generates a reference voltage Vref0 (for example, 2.1 V) corresponding to the point of the start of the regions VFB1 to VFB2 whose FB voltage-frequency characteristic in FIG. 7 is linear; the non-inversion amplification circuit 83 that generates the voltage (0.65 V to 2.1 V/0.45 V to 2.1 V) which is in proportion to the voltage (1.8 V to 2.1 V) having passed the upper and lower limit clamp circuit 81; and the buffer circuit 84 that performs the impedance conversion on the output of the non-inversion amplification circuit 83 and supplies the result to the oscillation circuit 31.

On the other hand, the oscillation circuit 31 is configured to generate the oscillation signal (clock signal φc) with the frequency in accordance with the output of the buffer circuit 84.

The frequency control circuit 38 according to this example is configured to switch the amplification ratio of the non-inversion amplification circuit 83, that is, the inclination of a line in the regions VFB1 to VFB2 where the FB voltage-frequency characteristic expressed in FIG. 7 is linear in accordance with the voltage of the external set terminal ADJ.

Note that in regard to FIG. 7 that expresses the FB voltage-frequency characteristic for the power supply control IC 13, since the feedback voltage VFB from the secondary side corresponds to the load current, it can be said that FIG. 7 shows the load current-frequency characteristic for the power supply.

As illustrated in FIG. 6, the upper and lower limit clamp circuit 81 includes four-input differential amplification circuit AMP1. To the inversion input terminal, the output voltage of itself is fed back. The upper and lower limit clamp circuit 81 operates as a buffer (voltage follower) that, when the voltage VFB of the feedback terminal FB of the power supply control IC is in the voltage range (1.8 V to 2.1 V) between the clamp voltages VFB1 and VFB2, transmits the feedback voltage VFB directly to the non-inversion input terminal side of the non-inversion amplification circuit 83 in the subsequent stage. The upper and lower limit clamp circuit 81 is configured so that when the feedback voltage VFB is the clamp voltage VFB1 (1.8 V) or less, the upper and lower limit clamp circuit 81 clamps the voltage to VFB1, and when the feedback voltage VFB is the clamp voltage VFB2 (2.1 V) or more, the upper and lower limit clamp circuit 81 clamps the voltage to VFB2 (2.1 V) and outputs the clamped voltage.

The reference voltage circuit 82 includes a reference voltage source VR and a buffer (voltage follower) BFF1, and supplies the reference voltage Vref0 (2.1 V) generated by the reference voltage source VR to the inversion input terminal side of the non-inversion amplification circuit 83 directly.

The non-inversion amplification circuit 83 includes a two-input differential amplification circuit AMP2, an input resistor R1 connected between the reference voltage circuit 82 and the inversion input terminal, feedback resistors R2 and R3 connected in series between the output terminal and the inversion input terminal, and the switch S1 connected in parallel to the feedback resistor R3 and the switch S2 connected in series with the feedback resistor R3. The switches S1 and S2 are configured so that one of them is turned on selectively in accordance with the potential of the external set terminal ADJ. When the switch S1 is turned on, just R2 is connected as the feedback resistor (the amplification ratio is small) and when the switch S2 is turned on, R2 and R3 are connected as the feedback resistors (the amplification ratio is large).

Specifically, the resistance values of the resistors R1, R2, and R3 are set so that: even in the case where either one of the switches S1 and S2 is on, when the feedback voltage VFB is 2.1 V, the output voltage of the non-inversion amplification circuit 83 is Vref0 (2.1 V) but when a feedback voltage VFB of 1.8 V is input with the switch S1 on, the output voltage of the non-inversion amplification circuit 83 is 0.65 V and when a feedback voltage VFB of 1.8 V is input with the switch S2 on, the output voltage of the non-inversion amplification circuit 83 is 0.45 V. Note that when the feedback voltage VFB is in the range of 1.8 V to 2.1 V, the voltage that changes in proportion to the feedback voltage VFB is output from the non-inversion amplification circuit 83. Then, the output of this non-inversion amplification circuit 83 is supplied to the oscillation circuit 31 through the buffer circuit 84. The buffer circuit 84 is formed by a voltage follower.

The oscillation circuit 31 includes: the current source circuit 311 that supplies current determined by the current flowing in the resistor R4 connected to the ground potential (GND) and the source voltage of the MOS transistor M1 controlled to have the same potential as the non-inversion input terminal by the buffer circuit 84; a frequency switching unit 312 that includes capacitors C11 and C12 that are charged with current from the current source circuit 311, and a switch S3 connected in series with the capacitor C12; and the oscillator unit 313 that includes a discharging MOS transistor M2 for discharging the charges in the capacitors C11 and C12, two comparators CMP1 and CMP2, and a flip-flop FF1.

By applying the output of the flip-flop FF1 to the gate terminal of the discharging MOS transistor M2, and repeatedly charging and discharging the capacitors C11 and C12, the triangular wave is generated on the inside and clock signals with a predetermined frequency are output. Note that the current source circuit 311 includes a current mirror circuit including the MOS transistors M3 and M4 to return the drain current from the MOS transistor M3.

As is clear from the above description, the current source circuit 311 supplies the current in accordance with the feedback voltage VFB. As a result, the oscillation signal φc generated in the oscillator unit 313 corresponds to the frequency in accordance with the feedback voltage VFB.

Figure 9:
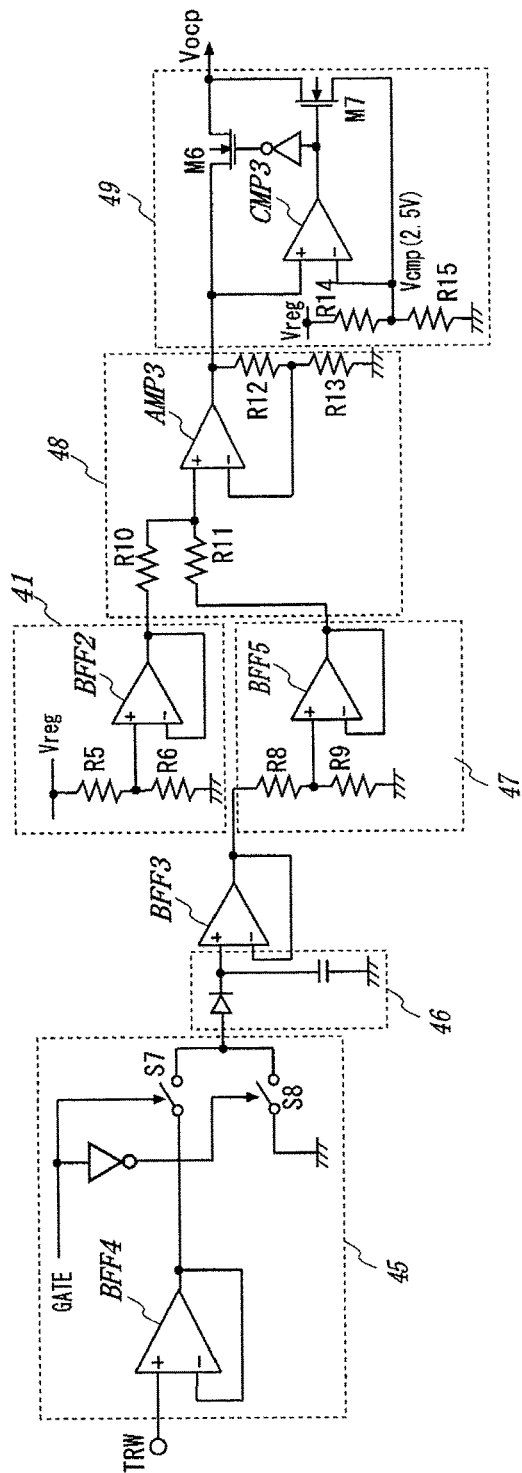
FIG. 9 is a circuit structure diagram illustrating another example of the OCP level generation circuit.

FIG. 9 illustrates another example of the over-current detection level generation circuit 40 in the power supply control IC in FIG. 2. Note that the circuit illustrated in FIG. 9 is the circuit configured to generate the over-current detection level Vocp expressed by the formula:

$$Vocp = Vint + ON\ Duty$$

in a manner similar to the over-current detection level generation circuit 40 illustrated in FIG. 5.

The over-current detection level generation circuit 40 illustrated in FIG. 9 includes: an on-duty detection circuit 45 that receives the driving pulse GATE and the triangular wave TRW and generates the voltage in proportion to the on-duty; a peak holding circuit 46 that holds the peak value of the output voltage of the on-duty detection circuit 45; a buffer BFF3; a voltage conversion circuit 47 that converts the held voltage into the voltage multiplied by a predetermined number by dividing the held voltage; the intercept voltage generation circuit 41 that generates the intercept voltage Vint (2.02 V); an adding circuit 48 that adds up the output voltage of the voltage conversion circuit 47 and the output voltage of the intercept voltage generation circuit 41; and a clamp circuit 49 that restricts the peak of the over-current detection level Vocp to a predetermined level (2.5 V).

The on-duty detection circuit 45 includes: a buffer BFF4 that receives the triangular wave TRW which is generated in the oscillation circuit 31 (see FIG. 6) and whose peak and bottom voltages do not change even if the frequency is changed; a switch S7 that transmits the output voltage of the buffer BFF4 to the peak holding circuit 46; and a switch S8 that is connected between the ground point and the peak holding circuit 46. Then, the switch S7 is turned on or off by the driving pulse GATE and the switch S8 is turned on or off by the /GATE corresponding to the inversion signal of the driving pulse GATE.

Thus, by holding the maximum voltage of the triangular wave TRW in the on period in the peak holding circuit 46, the on-duty is detected in a pseudo manner.

The voltage in accordance with the detected on-duty is supplied to the voltage conversion circuit 47 including resistors R8 and R9 for dividing voltage, which are connected in series, and a buffer BFF5 through the buffer BFF3, and is converted into voltage that is multiplied by a predetermined number (for example, 1/2.4). Then, to this voltage, the intercept voltage Vint (2.02 V) is added in the adding circuit 48 including input resistors R10 and R11 and an operational amplifier AMP3, so that the over-current detection voltage Vocp expressed by the above formula is generated and output through the clamp circuit 49.

The clamp circuit 49 includes: resistors R14 and R15 for dividing voltage, which are connected in series and generate a comparison voltage Vcmp such as 2.5 V by dividing the internal power supply voltage Vreg; a comparator CMP3 that compares the output voltage of the adding circuit 48 with the comparison voltage Vcmp (2.5 V); and MOS transistors M6 and M7 that are turned on or off complementarily by the output from the comparator CMP3. When the output voltage of the adding circuit 48 is the comparison voltage Vcmp (2.5 V) or less, M7 is turned off and M6 is turned on to output the output voltage of the adding circuit 48 directly as the over-current detection voltage Vocp; on the other hand, when the output voltage of the adding circuit 48 is more than the comparison voltage Vcmp (2.5 V), M6 is turned off and M7 is turned on to output the comparison voltage 2.5 V so as to clamp the over-current detection voltage Vocp.

Figure 10:
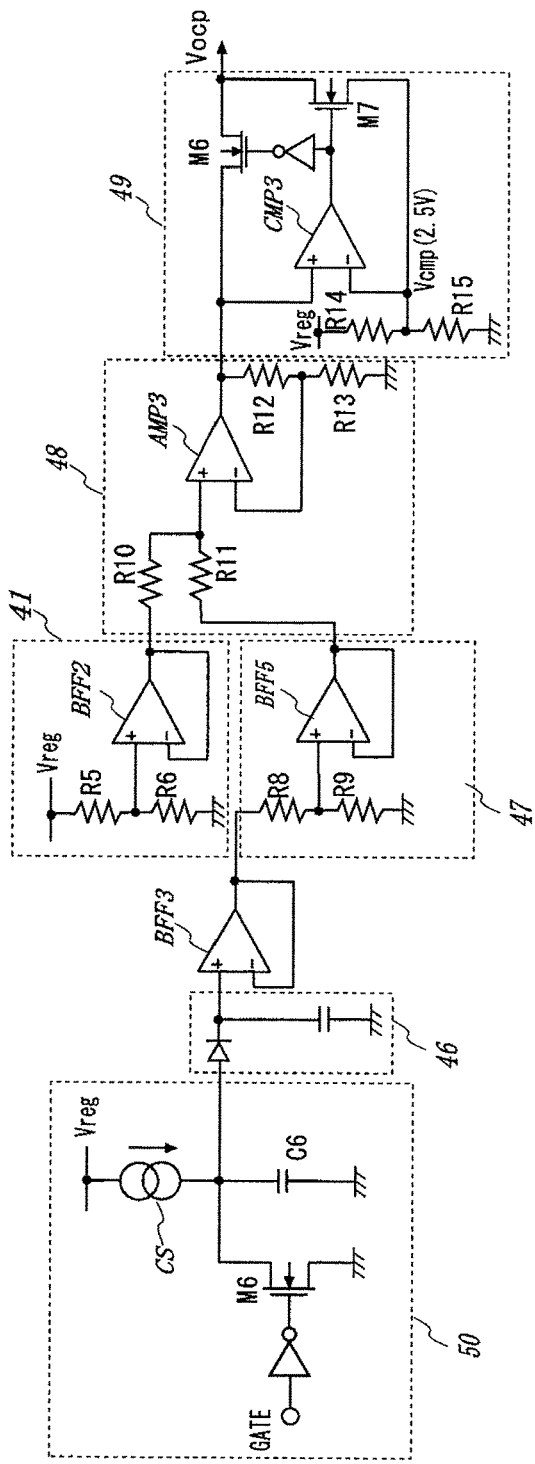
FIG. 10 is a circuit structure diagram illustrating a modification of the OCP level generation circuit.
Figure 11:
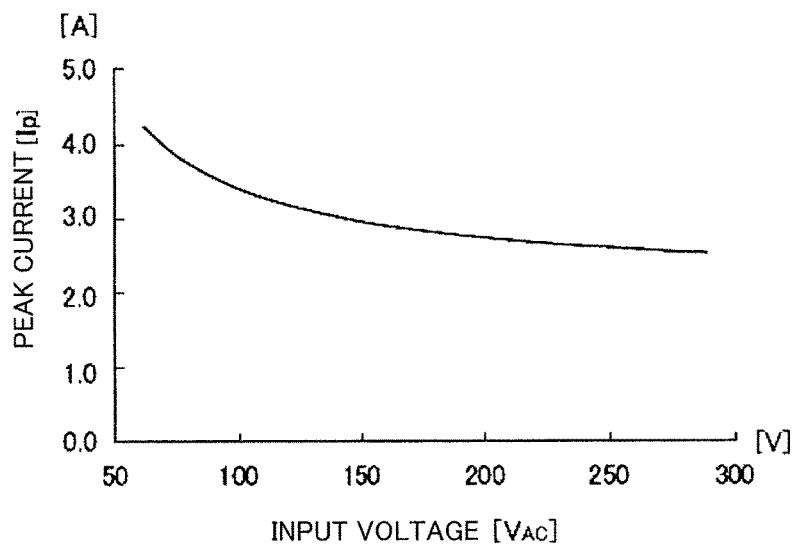
FIG. 11 is a graph expressing the relation between the AC input voltage VAC in the insulated AC-DC converter and the peak current on the primary side.
Figure 12:
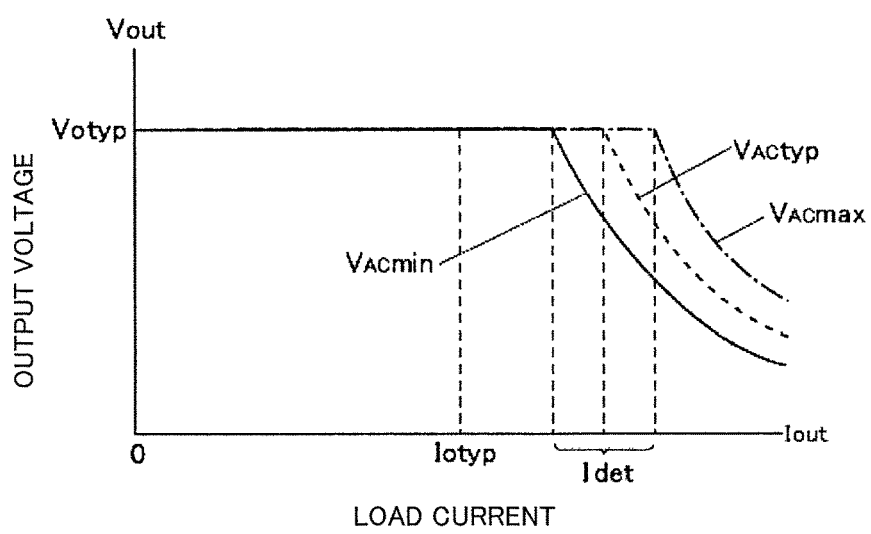
FIG. 12 is a graph expressing the characteristic which represents the relation between the load current and the output voltage in the AC-DC converter whose over-current protection operating point is not corrected.

FIG. 10 illustrates a modification of the over-current detection level generation circuit 40 in the power supply control IC in FIG. 2. The circuit according to this modification is configured to generate the over-current detection level reflecting the on time of the switching transistor SW.

The over-current detection level generation circuit 40 illustrated in FIG. 10 includes an on-time detection circuit 50 instead of the on-duty detection circuit 45 in the over-current detection level generation circuit 40 in FIG. 9. The on-time detection circuit 50 generates the voltage in proportion to the on time by turning off the MOS transistor M6 and charging the condenser C6 with the current from the constant-current source CS only in the period where the driving pulse GATE is at the high level. Except this point, the over-current detection level generation circuit 40 in FIG. 10 has the same structure as that of the over-current detection level generation circuit 40 in FIG. 9.

The invention made by the present inventor has been described in detail based on the embodiment but the present invention is not limited to the embodiment. For example, in the embodiment, the switching transistor SW that supplies current intermittently to the primary-side winding wire of the transformer is an element separated from the power supply control IC 13 but this switching transistor SW may be taken into the power supply control IC 13 to form one semiconductor integrated circuit.

INDUSTRIAL APPLICABILITY

In the description of the above embodiment, the present invention is applied to the power supply control IC that forms a flyback type AC-DC converter. However, the present invention is also applicable to a power supply control IC that forms a forward type or a quasi-resonance type AC-DC converter.

REFERENCE SIGNS LIST

- 11 line filter
- 12 diode bridge circuit (rectification circuit)
- 13 power supply control circuit (power supply control IC)
- 14 secondary-side detection circuit (detection IC)
- 15a diode on emission side of photocoupler
- 15b transistor on light reception side of photocoupler
- 31 oscillation circuit
- 32 clock generation circuit
- 34 driver (driving circuit)
- 35 amplifier (non-inversion amplification circuit)
- 36a comparator for over-current detection (over-current detection circuit)
- 36b comparator for voltage/current control (voltage/current control circuit)
- 37 waveform generation circuit
- 38 frequency control circuit
- 39 duty limiting circuit
- 40 over-current detection level generation circuit
- 41 intercept voltage generation circuit
- 42 variable current circuit
- 43 OPS waveform generation circuit
- 44 buffer amplifier

The invention claimed is:

1. A semiconductor device for power supply control that generates and outputs a driving pulse to turn on or off a switching element which intermittently supplies a current to a primary-side winding wire of a transformer for a voltage conversion, in accordance with a voltage in proportion to a current flowing in the primary-side winding wire of the transformer and an output voltage detection signal from a secondary side of the transformer, the device comprising:

an over-current detection circuit which detects an over-current state on a secondary side of the transformer by comparing the voltage in proportion to the current flowing in the primary-side winding wire with an over-current detection voltage;

a control signal generation circuit which generates a control signal to turn off the switching element when the over-current detection circuit has detected the over-current state; and an over-current detection level generation circuit which generates the over-current detection voltage in accordance with an on-duty of the driving pulse of the switching element, wherein the over-current detection level generation circuit comprises:

a variable current source which generates a current in accordance with an output voltage detection signal from the secondary side;

a capacitor element which is charged with the current from the variable current source;

a discharging unit which discharges the charges in the capacitor element by a change from an on-level to an off-level of the driving pulse; and an intercept voltage generation circuit which generates a reference voltage of the over-current detection voltage, wherein in a period for which the driving pulse is at the on-level, a voltage charged in the capacitor element with the current from the variable current source connected to the capacitor element is added to the voltage output from the intercept voltage generation circuit, and wherein the over-current detection level generation circuit is configured to generate the over-current detection voltage in accordance with the formula:

$$Vocp = Vint + a \cdot ON\ Duty$$

where Vocp represents the over-current detection voltage, ON Duty represents the on-duty, Vint represents the over-current detection voltage to be a reference, and "a" represents a positive number correction coefficient.

2. The semiconductor device for power supply control according to claim 1, further comprising a clock generation circuit which includes an oscillation circuit whose frequency is variable in accordance with a magnitude of current flowing from the variable current source and which generates a clock signal that provides a timing to turn on the switching element periodically, wherein the variable current source in the over-current detection level generation circuit is configured as a variable current source common to the variable current source in the clock generation circuit.

* * * * *